US011487910B2

(12) United States Patent
Zhu et al.

(10) Patent No.: US 11,487,910 B2
(45) Date of Patent: Nov. 1, 2022

(54) TERMINAL AND COMMUNICATION METHOD

(71) Applicant: HUAWEI TECHNOLOGIES CO., LTD., Guangdong (CN)

(72) Inventors: Li Zhu, Xi'an (CN); Zhufeng Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 16/881,793

(22) Filed: May 22, 2020

(65) Prior Publication Data

US 2020/0285781 A1 Sep. 10, 2020

Related U.S. Application Data

(63) Continuation of application No. PCT/CN2018/090212, filed on Jun. 7, 2018.

(30) Foreign Application Priority Data

Nov. 30, 2017 (CN) .......................... 201711240720.5

(51) Int. Cl.
  *G06F 21/85* (2013.01)
  *G06F 13/40* (2006.01)
  *H04W 12/08* (2021.01)

(52) U.S. Cl.
  CPC .......... *G06F 21/85* (2013.01); *G06F 13/4004* (2013.01); *H04W 12/08* (2013.01)

(58) Field of Classification Search
  CPC ....................................................... G06F 21/85
  See application file for complete search history.

(56) References Cited

U.S. PATENT DOCUMENTS

| | | | | |
|---|---|---|---|---|
| 6,067,595 A | * | 5/2000 | Lindenstruth | G06F 21/72 711/149 |
| 6,178,324 B1 | * | 1/2001 | Choquet | H04M 1/72403 455/558 |

(Continued)

FOREIGN PATENT DOCUMENTS

| | | |
|---|---|---|
| CN | 2381073 Y | 5/2000 |
| CN | 101388912 A | 3/2009 |

(Continued)

OTHER PUBLICATIONS

"R Global System for Mobile Communications Digital cellular telecommunications system (Phase 2+); Subscriber Identity Modules (SIM);Functional characteristics (GSM 02.17 version 5.1.1 Release 1996);ETS 300 922", European Telecommunication Standard, European Telecommunications Standards Institute (ETSI), 650 Route Des Lucioles, Sophia Antipolis Cedex, F-06921, France, vol. SMG1; SMG9, No. Second Edition, Apr. 1, 1999, total 15 pages. XP014014849.

(Continued)

*Primary Examiner* — Ponnoreay Pich
(74) *Attorney, Agent, or Firm* — WHDA, LLP

(57) ABSTRACT

A terminal includes a security subsystem, a baseband processor, and a first bidirectional bus coupled between the security subsystem and the baseband processor. The security subsystem is configured to manage at least one of data related to a user identity and data related to network security in wireless communication, and exchange the data with the baseband processor by using the first bidirectional bus. The baseband processor is configured to exchange the data with the security subsystem by using the first bidirectional bus, and implement wireless communication by using the data. The security subsystem and the baseband processor are in the same hierarchy. The security subsystem may proactively (Continued)

perform data transmission by using the first bidirectional bus.

20 Claims, 9 Drawing Sheets

(56) References Cited

U.S. PATENT DOCUMENTS

| | | | |
|---|---|---|---|
| 2005/0084272 | A1 | 4/2005 | Kikuchi |
| 2006/0021035 | A1* | 1/2006 | Conti .................... G06F 21/554 726/22 |
| 2011/0252172 | A1* | 10/2011 | Sun ........................ G06K 19/07 710/305 |
| 2012/0159149 | A1 | 6/2012 | Martin et al. |
| 2012/0260095 | A1* | 10/2012 | Von Hauck ............. H04W 4/60 713/176 |
| 2013/0346639 | A1* | 12/2013 | Stroud ................ G06F 13/4004 710/14 |
| 2015/0089586 | A1* | 3/2015 | Ballesteros ......... H04W 12/088 726/3 |
| 2016/0078253 | A1* | 3/2016 | Frank ................. G06F 12/1408 726/26 |

FOREIGN PATENT DOCUMENTS

| | | |
|---|---|---|
| CN | 101754448 A | 6/2010 |
| CN | 201622594 U | 11/2010 |
| CN | 102033828 A | 4/2011 |
| CN | 102194292 A | 9/2011 |
| CN | 102368878 A | 3/2012 |
| CN | 102467479 A | 5/2012 |
| CN | 102831450 A | 12/2012 |
| CN | 103747011 A | 4/2014 |
| CN | 104021104 A | 9/2014 |
| CN | 104778794 A | 7/2015 |
| CN | 105493538 A | 4/2016 |
| EP | 1605359 A1 | 12/2005 |

OTHER PUBLICATIONS

The Partial Supplementary European Search Report dated Nov. 24, 2020, issued in counterpart EP Application No. 18882795.0 (15 pages).

ISO/IEC 7816-3, Information technology—Identification cards—Integrated circuit(s) cards with contacts-Part 3: Electronic signals and transmission protocols, Dec. 15, 1997. total 32 pages.

ISO/IEC FDIS 7816-12, Identification cards—Integrated circuit cards—Part 12: Cards with contacts—USB electrical interface and operating procedures, 2005. total 60 pages.

Office Action dated Feb. 26, 2020, issued in counterpart CN Application No. 201711240720.5, with English translation (24 pages).

International Search Report dated Aug. 29, 2018, issued in counterpart CN Application No. PCT/CN2018/090212, with English translation (12 pages).

CHEN Xin-gang et al, One of the Positioning Alarm System for Transmission Line Insulator Flashover, 2013, 7 pages.

Notice of Allowance and Notification of Grant Patent dated Apr. 13, 2022, issued in counterpart CN Application No. 201711240720.5, with English translation. (6 pages).

* cited by examiner

TERMINAL AND COMMUNICATION METHOD

CROSS-REFERENCE TO RELATED APPLICATION

This application is a continuation of International Application No. PCT/CN2018/090212, filed on Jun. 7, 2018, which claims priority to Chinese Patent Application No. 201711240720.5, filed on Nov. 30, 2017. The disclosures of the aforementioned applications are hereby incorporated by reference in their entireties.

TECHNICAL FIELD

This application relates to the field of communications technologies, and in particular, to a terminal and a communication method.

BACKGROUND

With development of information technologies, terminals such as a mobile phone and a tablet computer have become an indispensable part of people's daily life. The terminal generally includes a smart card and a communication processor. The smart card stores at least one of data related to a user identity and data related to network security. For example, the smart card may store a communication parameter, authentication data, and the like. The communication processor may communicate with the smart card to read the data stored in the smart card.

In related technologies, the smart card is connected to the communication processor by using a contact. In this case, the smart card communicates with the communication processor according to the ISO 7816 protocol. As stipulated in the ISO 7816 protocol, the communication processor is in an active hierarchy, and the smart card is in a passive hierarchy. To be specific, communication between the communication processor and the smart card can be initiated only by the communication processor rather than the smart card, and the smart card can only make a response.

In this case, the smart card can rely only on the communication processor to read data stored in the smart card, but cannot actively transmit the data to the communication processor. In other words, if the smart card needs to transmit the data to the communication processor, the smart card can transmit the data only after a read command transmitted by the communication processor is received. As a result, flexibility of communication between the smart card and the communication processor is comparatively low, and a communication rate is comparatively low.

SUMMARY

This application provides a terminal and a communication method. The method may resolve a problem in related technologies in which flexibility of communication between a security subsystem and a primary processing system is comparatively low and a communication rate is comparatively low. The technical solutions are as follows.

According to a first aspect, a terminal is provided. The terminal includes a security subsystem, a primary processing system, and a first bidirectional bus coupled between the security subsystem and the primary processing system.

The security subsystem is configured to manage at least one of data related to a user identity and data related to network security in wireless communication, and exchange the data with the primary processing system by using the first bidirectional bus.

The primary processing system is configured to exchange the data with the security subsystem by using the first bidirectional bus, and implement wireless communication by using the data.

It should be noted that the security subsystem is a securely isolated subsystem, and an internal component of the security subsystem is invisible to the outside. To be specific, a functional component outside a security subsystem can access the security subsystem only by using a specified interface. For example, the security subsystem may be a subscriber identity module (SIM) card, or an embedded SIM (eSIM) card.

In addition, the primary processing system is configured to process various types of data in the terminal, and the primary processing system can be used to implement a wireless communication function of the terminal. In other words, the primary processing system can be responsible for execution of all communication software in the terminal. For example, the primary processing system may be a communication processor (CP) (also referred to as a baseband processor (BP)), or a central processing unit (CPU).

In embodiments of this application, when the security subsystem and the primary processing system are connected by using the first bidirectional bus, the security subsystem and the primary processing system are in the same hierarchy. To be specific, the security subsystem can actively transmit data to the primary processing system by using the first bidirectional bus, and the primary processing system can also actively transmit data to the security subsystem by using the first bidirectional bus, thereby improving flexibility of communication between the security subsystem and the primary processing system. In addition, because a transmission rate on the first bidirectional bus is comparatively high, when data is transmitted between the security subsystem and the primary processing system by using the first bidirectional bus, a rate of data transmission between the security subsystem and the primary processing system is comparatively high, thereby increasing a rate of communication between the security subsystem and the primary processing system.

In a possible design, communication between the security subsystem and the primary processing system is performed in a full-duplex manner by using the first bidirectional bus.

In the embodiments of this application, when the security subsystem transmits data to the primary processing system by using the first bidirectional bus, the primary processing system may also transmit data to the security subsystem by using the first bidirectional bus. In this case, both the security subsystem and the primary processing system can receive data while transmitting data, thereby further increasing a rate of communication between the security subsystem and the primary processing system.

In a possible design, the security subsystem includes at least two physical interfaces.

The at least two physical interfaces are both connected to the first bidirectional bus. The security subsystem and the primary processing system perform parallel data exchange concurrently by using the at least two physical interfaces.

In the embodiments of this application, the at least two physical interfaces are both connected to the first bidirectional bus. To be specific, at least two physical channels are established between the first bidirectional bus and the security subsystem, which actually also means that the at least two physical channels are established between the primary processing system and the security subsystem. In this case, the primary processing system can simultaneously transmit data to the security subsystem by using the at least two physical channels, and the security subsystem can simultaneously transmit data to the primary processing system by using the at least two physical channels. When the primary processing system transmits data to the security subsystem by using the at least two physical channels, the security subsystem may also transmit data to the primary processing system by using the at least two physical channels. In other words, different operations may be performed simultaneously between the security subsystem and the primary processing system by using the first bidirectional bus and different physical interfaces. In this case, a parallel transmission manner is used between the security subsystem and the primary processing system, thereby further increasing a rate of communication between the security subsystem and the primary processing system.

In a possible design, the security subsystem includes a plurality of components and a second bidirectional bus.

Connections between the plurality of components are established by using the second bidirectional bus, to implement data transmission between the plurality of components.

In the embodiments of this application, after the plurality of components are connected by using the second bidirectional bus, any one of the plurality of components may actively transmit data to another component by using the second bidirectional bus, and the another component may actively transmit data to the component by using the second bidirectional bus. In addition, because a transmission rate on the second bidirectional bus is comparatively high, when data is transmitted, by using the second bidirectional bus, between the plurality of components included in the security subsystem, a rate of data transmission between the plurality of components is comparatively high, thereby improving data processing efficiency of the security subsystem.

In a possible design, at least two of the plurality of components are the at least two physical interfaces.

In this case, each of the at least two physical interfaces may be a bus interface, and a connection between the first bidirectional bus and the second bidirectional bus may be established by using the at least two physical interfaces. The at least two physical interfaces function as "converters" between the first bidirectional bus and the second bidirectional bus. In other words, protocol conversion, data conversion, and the like between the first bidirectional bus and the second bidirectional bus can be completed by using the at least two physical interfaces, thereby implementing communication between the first bidirectional bus and the second bidirectional bus. In other words, data can be transmitted between the first bidirectional bus and the second bidirectional bus by using the at least two physical interfaces.

In a possible design, communication between the plurality of components is performed in a full-duplex manner by using the second bidirectional bus.

In the embodiments of this application, when any one of the plurality of components transmits data to another component by using the second bidirectional bus, the another component may also transmit data to the component by using the second bidirectional bus. In this case, the plurality of components can all receive data while transmitting data, thereby further improving efficiency of data transmission between the plurality of components and further improving data processing efficiency of the security subsystem.

In a possible design, the terminal further includes a memory.

A connection between the memory and the security subsystem is established by using the first bidirectional bus. The security subsystem manages, by using the first bidirectional bus, data stored in the memory.

In the embodiments of this application, the memory included in the terminal is a memory outside the security subsystem. When the memory stores the data managed by the security subsystem, that is, when the security subsystem can store the managed data in the memory, a volume of the data that can be managed by the security subsystem is increased, thereby enlarging an application scope of the security subsystem. When the memory is connected to the security subsystem by using the first bidirectional bus, because the transmission rate on the first bidirectional bus is comparatively high, the security subsystem can comparatively quickly obtain, by using the first bidirectional bus, the data managed by the security subsystem.

According to a second aspect, a communication method is provided. The communication method is applied to the terminal in the foregoing first aspect or any possible design of the first aspect. The method includes:

sending, by a security subsystem, an interrupt request to a primary processing system by using a first bidirectional bus, where the interrupt request is used to instruct the primary processing system to receive a first command sent by the security subsystem, and the first command is used to instruct the primary processing system to perform an operation related to data managed by the security subsystem; and sending, by the security subsystem, the first command to the primary processing system by using the first bidirectional bus.

Further, when receiving the interrupt request, the primary processing system may make an interrupt response to the interrupt request to receive the first command. In addition, when receiving the first command, the primary processing system may execute the first command to obtain a response result of the first command, and send the response result of the first command to the security subsystem by using the first bidirectional bus.

In the embodiments of this application, the security subsystem and the primary processing system included in the terminal are connected by using the first bidirectional bus. In this case, the security subsystem and the primary processing system are in the same hierarchy. Therefore, when the security subsystem needs to perform, by using the primary processing system, the operation related to the data managed by the security subsystem, the security subsystem may actively send the interrupt request to the primary processing system by using the first bidirectional bus, and then actively send, to the primary processing system by using the first bidirectional bus, the first command for implementing the operation, to instruct the primary processing system to complete the operation. In this case, flexibility of communication between the security subsystem and the primary processing system is comparatively high. Because the security subsystem can actively send the first command to the primary processing system without an instruction from the primary processing system, a rate of communication between the security subsystem and the primary processing system is comparatively high.

In a possible design, the method further includes:

sending, by the primary processing system, a second command to the security subsystem by using the first bidirectional bus, where the second command includes a command data header and command data content, and the command data header is used to instruct the security subsystem to perform an operation related to the command data content;

executing, by the security subsystem, the second command; and sending, by the security subsystem, a response result of the second command to the primary processing system by using the first bidirectional bus, where the response result includes a processing status and data content obtained through processing.

It should be noted that when the first command or the second command carries both a command data header and command data content, the command data header and the command data content are transmitted between the security subsystem and the primary processing system at a time, thereby increasing a rate of communication between the security subsystem and the primary processing system. When the response result of the first command or the response result of the second command carries both a processing status and data content obtained through processing, the processing status and the data content obtained through processing are transmitted between the security subsystem and the primary processing system at a time, thereby increasing a rate of communication between the security subsystem and the primary processing system.

In the embodiments of this application, the security subsystem may actively send the first command to the primary processing system, and then the primary processing system returns the response result of the first command, to implement the operation to be completed by the security subsystem. In addition, the primary processing system may actively send the second command to the security subsystem, and then the security subsystem returns the response result of the second command, to implement the operation to be completed by the primary processing system. To be specific, when the security subsystem and the primary processing system interactively perform a specific operation, the operation can be completed through only two times of interaction. Therefore, the number of times of interaction between the security subsystem and the primary processing system is greatly reduced, and a rate of communication between the security subsystem and the primary processing system is increased.

In a possible design, the security subsystem includes at least two physical interfaces. The sending, by the primary processing system, a second command to the security subsystem by using the first bidirectional bus includes:

selecting, by the primary processing system, one physical interface from the at least two physical interfaces as a target physical interface; and sending, by the primary processing system, the second command to the security subsystem by using the first bidirectional bus and the target physical interface.

Correspondingly, the sending, by the security subsystem, a response result of the second command to the primary processing system by using the first bidirectional bus includes:

sending, by the security subsystem, the response result of the second command to the primary processing system by using the first bidirectional bus and the target physical interface.

In the embodiments of this application, the first bidirectional bus and the security subsystem may be connected by using the at least two physical interfaces. Therefore, at least two physical channels are established between the first bidirectional bus and the security subsystem, that is, the at least two physical channels are established between the primary processing system and the security subsystem. In this case, communication between the security subsystem and the primary processing system may be performed by using the at least two physical channels. In other words, different operations may be performed simultaneously between the security subsystem and the primary processing system by using the first bidirectional bus and different physical interfaces. In this case, a parallel transmission manner is used between the security subsystem and the primary processing system, thereby increasing a rate of communication between the security subsystem and the primary processing system.

In a possible design, a length of data transmitted between the security subsystem and the primary processing system for a single time by using the first bidirectional bus is not limited. In other words, a maximum length of the data transmitted for the single time is at least greater than 255 bytes, thereby greatly increasing a rate of communication between the security subsystem and the primary processing system.

According to a third aspect, a computer-readable storage medium is provided. The computer-readable storage medium stores an instruction. When the instruction is run on a computer or a processor, the computer or the processor is enabled to perform the communication method according to the foregoing second aspect or any possible design of the second aspect.

According to a fourth aspect, a computer program product including an instruction is provided. When the instruction is run on a computer or a processor, the computer or the processor is enabled to perform the communication method according to the foregoing second aspect or any possible design of the second aspect.

Technical effects obtained in the third aspect and the fourth aspect are similar to those obtained by using a corresponding technical means in the second aspect. Details are not described herein again.

Beneficial effects brought by the technical solutions provided in this application are as follows. The terminal includes the security subsystem, the primary processing system, and the first bidirectional bus coupled between the security subsystem and the primary processing system. The security subsystem is configured to manage at least one of the data related to a user identity and the data related to network security in the wireless communication, and exchange the data with the primary processing system by using the first bidirectional bus. The primary processing system is configured to exchange the data with the security subsystem by using the first bidirectional bus, and implement wireless communication by using the data. Because the connection between the security subsystem and the primary processing system is established by using the first bidirectional bus, the security subsystem and the primary processing system are in the same hierarchy. To be specific, the security subsystem can actively transmit data to the primary processing system by using the first bidirectional bus, and the primary processing system can also actively transmit data to the security subsystem by using the first bidirectional bus, thereby improving flexibility of communication between the security subsystem and the primary processing system. In addition, because a transmission rate on the first bidirectional bus is comparatively high, when data is transmitted between the security subsystem and the primary processing system by using the first bidirectional bus, a rate of data transmission between the security subsystem and the primary processing system is comparatively high, thereby increasing a rate of communication between the security subsystem and the primary processing system.

REFERENCE NUMERALS

Figure 1A:
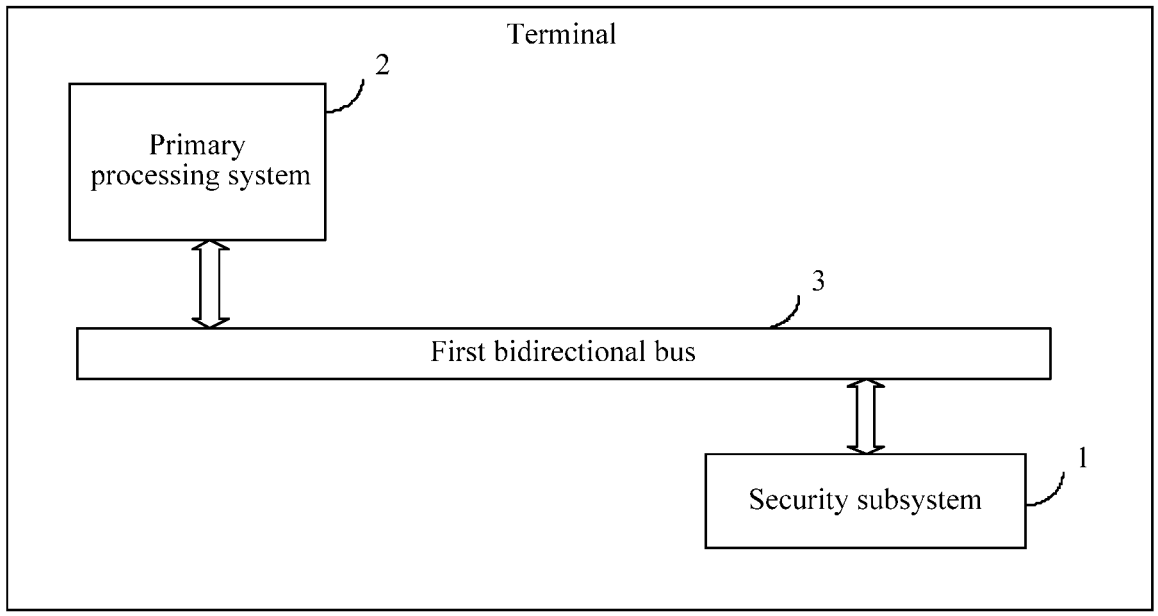
FIG. 1A is a schematic structural diagram of a first terminal according to an embodiment of this application.

1: security subsystem; 1a: physical interface; 11: component; 12: second bidirectional bus; 2: primary processing system; 3: first bidirectional bus; 4: memory.

DESCRIPTION OF EMBODIMENTS

To make the objectives, technical solutions, and advantages of this application clearer, the following further describes the implementations of this application in detail with reference to the accompanying drawings.

Before the embodiments of this application are explained and described in detail, application scenarios in the embodiments of this application are first described.

First, the terms used in the embodiments of this application are explained.

A security subsystem is a securely isolated subsystem, and an internal component of the security subsystem is invisible to the outside. To be specific, a functional component outside the security subsystem can access the security subsystem only by using a specified interface. For example, the security subsystem may be a smart card (also referred to as an integrated circuit (IC) card, a microchip card, or the like). The security subsystem may be used to manage at least one of data related to a user identity and data related to network security in wireless communication. The data related to a user identity may include at least one of an international mobile subscriber identity (IMSI), an authentication key (Ki), a personal identification number (PIN), an unlock key (PUK), and the like. The data related to network security may include at least one of a location area identity (LAI), a temporary mobile subscriber identity (TMSI), a forbidden public land mobile network (FPLMN), and the like.

A primary processing system is configured to process various types of data in a terminal, and the primary processing system can be used to implement a wireless communication function of the terminal. In other words, the primary processing system can be responsible for execution of all communication software in the terminal. For example, the primary processing system may be a CP (also referred to as a BP), or a CPU. The primary processing system can exchange the data managed by the security subsystem with the security subsystem, and implement wireless communication by using the data obtained through exchange.

A bidirectional bus is a public communication path used when data is transmitted between various functional components included in a terminal, and the bidirectional bus is a transmission wire bundle formed by wires. In other words, connection and communication between the functional components may be performed by using the bidirectional bus. The bidirectional bus has a bidirectional transmission capability. To be specific, any one of a plurality of functional components connected to the bidirectional bus may selectively transmit data to another functional component, and may selectively receive data transmitted by the another functional component. For example, the bidirectional bus may be an inter-integrated circuit (I2C) bus or a serial peripheral interface (SPI) bus.

Application scenarios related in the embodiments of this application are explained.

The embodiments of this application are applied to a communication scenario between a security subsystem and a primary processing system included in a terminal. Currently, the security subsystem included in the terminal is generally a smart card, and the primary processing system included in the terminal is generally a communication processor. The smart card and the communication processor are connected by using a contact, and communicate according to the ISO 7816 protocol. However, the following cases occur when the smart card and the communication processor communicate according to the ISO 7816 protocol.

1. Communication between the communication processor and the smart card can be initiated only by the communication processor rather than the smart card, and the smart card can only respond to a command transmitted by the communication processor.

2. A maximum length of data transmitted between the smart card and the communication processor is 255 bytes. When to-be-transmitted data exceeds the maximum length, the data needs to be divided and then transmitted for a plurality of times. In addition, when the communication processor transmits a command to the smart card, the communication processor needs to separately transmit a command data header and command data content to the smart card. After executing the command, the smart card also needs to separately transmit a processing status and data content obtained through processing to the communication processor.

3. The communication processor and the smart card communicate in a half-duplex manner. To be specific, only one of the communication processor and the smart card can transmit data at a time, and the other one can transmit data only after the data transmitted by the one of the communications processor and the smart card is received.

4. A clock of the smart card can be controlled only by the communication processor but not by the smart card. In other words, only the communication processor can control the clock of the smart card to stop or control the clock of the smart card to be restored.

In the foregoing cases, flexibility of communication and a rate of communication between the smart card and the communication processor are both low. Therefore, in the embodiments of this application, a contact connection manner used between the security subsystem and the primary processing system included in the terminal is changed to a bidirectional bus connection manner. Therefore, after the connection manner is changed, the communication between the security subsystem and the primary processing system may break through a limitation of the ISO 7816 protocol, to obtain a new communication manner, thereby improving flexibility of communication and a rate of communication between the security subsystem and the primary processing system.

The following describes in detail the terminal provided in the embodiments of this application.

FIG. 1A is a schematic structural diagram of a terminal according to an embodiment of this application. Referring to FIG. 1A, the terminal includes a security subsystem 1, a primary processing system 2, and a first bidirectional bus 3 coupled between the security subsystem 1 and the primary processing system 2.

The security subsystem 1 is used to manage at least one of data related to a user identity and data related to network security in wireless communication, and exchange the data with the primary processing system 2 by using the first bidirectional bus 3.

The primary processing system 2 is used to exchange the data with the security subsystem 1 by using the first bidirectional bus 3, and implement wireless communication by using the data.

It should be noted that the security subsystem 1 is a securely isolated subsystem, and an internal component of the security subsystem is invisible to the outside. To be specific, a functional component outside a security subsystem 1 can access the security subsystem 1 only by using a specified interface. For example, the security subsystem 1 may be a smart card, or an eSIM card. The security subsystem 1 may manage at least one of the data related to a user identity and the data related to network security in the wireless communication. The data related to a user identity may include at least one of an IMSI, a Ki, a PIN, a PUK, and the like. The data related to network security may include at least one of a LAI, a TMSI, an FPLMN, and the like. Optionally, the security subsystem 1 may be independent of the primary processing system 2. For example, the security subsystem 1 may be a pluggable SIM card. Optionally, the security subsystem 1 and the primary processing system 2 may be integrated on a same chip. For example, the security subsystem 1 and the primary processing system 2 may be both included in a system on chip (SOC) of the terminal.

In addition, the primary processing system 2 is used to process various types of data in the terminal, and the primary processing system 2 can be used to implement a wireless communication function of the terminal. In other words, the primary processing system 2 can be responsible for execution of all communication software in the terminal. For example, the primary processing system may be a CP or a CPU. The primary processing system 2 can exchange the data managed by the security subsystem 1 with the security subsystem 1, and implement wireless communication by using the data obtained through exchange.

Figure 1B:
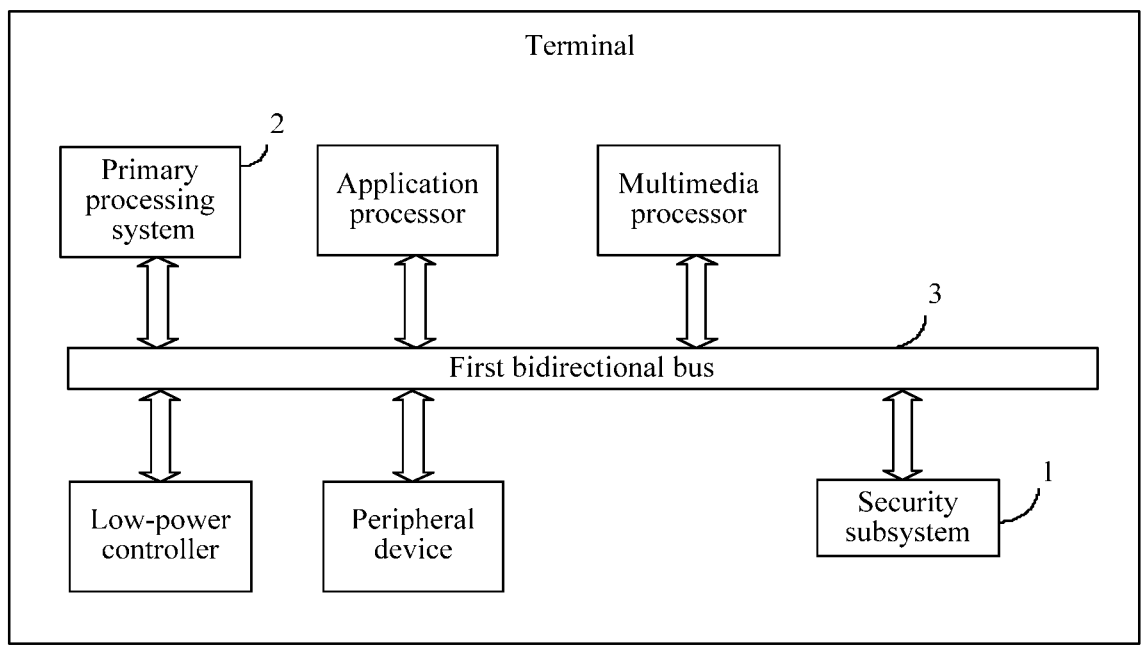
FIG. 1B is a schematic structural diagram of a second terminal according to an embodiment of this application.

It should be noted that the first bidirectional bus 3 has a bidirectional transmission capability, and the first bidirectional bus 3 may be a public path used between a plurality of functional components included in the terminal. All the plurality of functional components may be connected to the first bidirectional bus 3, to implement connections between the plurality of functional components. In this case, data may be transmitted between the plurality of functional components by using the first bidirectional bus 3. For example, as shown in FIG. 1B, the plurality of functional components may include the security subsystem 1, the primary processing system 2, an application processor, a multimedia processor, a low-power controller, a peripheral device (such as Bluetooth, a keyboard, or a screen), and the like. Data can be transmitted between the plurality of functional components by using the first bidirectional bus 3.

In addition, a transmission rate on the first bidirectional bus 3 is comparatively high and is generally greater than a transmission rate obtained when a contact is used. For example, the first bidirectional bus 3 may be an I2C bus, or an SPI bus. In an optional solution, the first bidirectional bus 3 may be a high-speed bus, and a transmission rate on the high-speed bus is greater than a transmission rate on a common bus. For example, the first bidirectional bus 3 may be a high-speed bus such as a peripheral component interconnect express (PCIe) bus or a hyper transport (HT) bus.

It should be noted that when the security subsystem 1 and the primary processing system 2 are connected by using the first bidirectional bus 3, the security subsystem 1 and the primary processing system 2 are in the same hierarchy. To be specific, the security subsystem 1 can actively transmit data to the primary processing system 2 by using the first bidirectional bus 3, and the primary processing system 2 can actively transmit data to the security subsystem 1 by using the first bidirectional bus 3, thereby improving flexibility of communication between the security subsystem 1 and the primary processing system 2.

In addition, because a transmission rate on the first bidirectional bus 3 is comparatively high, when data is transmitted between the security subsystem 1 and the primary processing system 2 by using the first bidirectional bus 3, a rate of data transmission between the security subsystem 1 and the primary processing system 2 is comparatively high, thereby increasing a rate of communication between the security subsystem 1 and the primary processing system 2.

Communication between the security subsystem 1 and the primary processing system 2 may be performed in a full-duplex manner by using the first bidirectional bus 1. To be specific, when the security subsystem 1 transmits data to the primary processing system 2 by using the first bidirectional bus 3, the primary processing system 2 may also transmit data to the security subsystem 1 by using the first bidirectional bus 3. In this case, the security subsystem 1 and the primary processing system 2 can both receive data while transmitting data, thereby further increasing a rate of communication between the security subsystem 1 and the primary processing system 2.

Figure 1C:
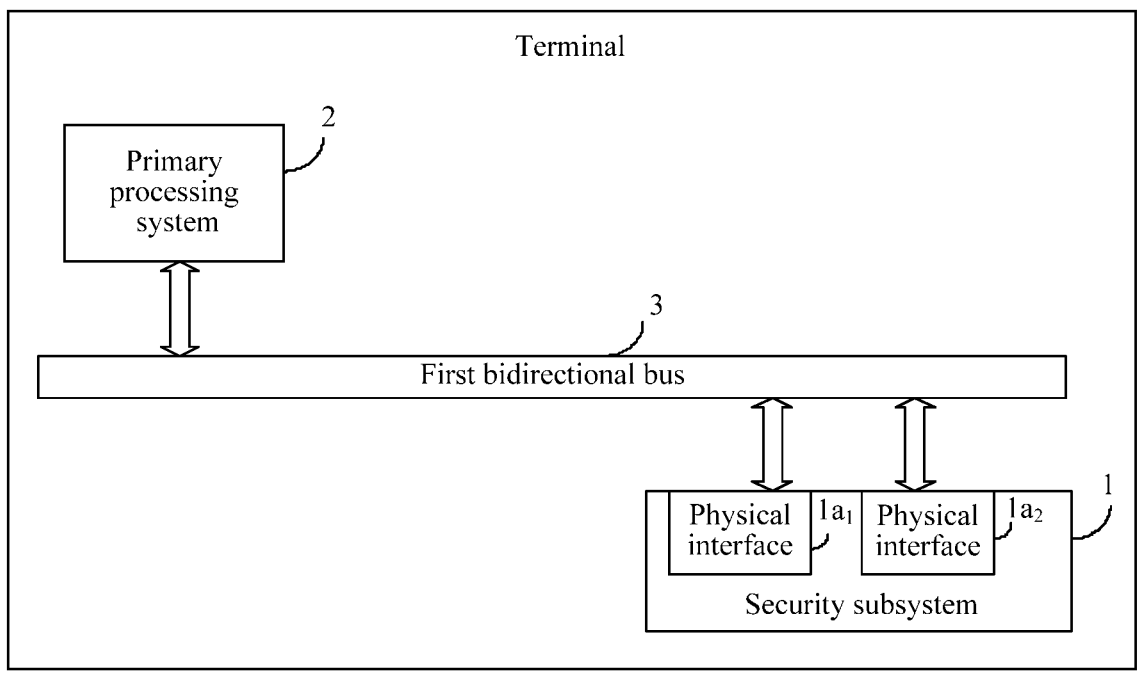
FIG. 1C is a schematic structural diagram of a third terminal according to an embodiment of this application.

Referring to FIG. 1C, the security subsystem 1 includes at least two physical interfaces 1a.

The at least two physical interfaces 1a are both connected to the first bidirectional bus 3. The security subsystem 1 and the primary processing system 2 simultaneously exchange, concurrently by using the at least two physical interfaces 1a, the data managed by the security subsystem 1.

It should be noted that the at least two physical interfaces 1a are hardware interfaces between the security subsystem 1 and the first bidirectional bus 3. For example, any physical interface $1a_x$ in the at least two physical interfaces 1a may be an I2C interface or an SPI interface. The at least two physical interfaces 1a may receive data from the first bidirectional bus 3 or may transmit data to the first bidirectional bus 3. In other words, the security subsystem 1 may receive data from the first bidirectional bus 3 by using the at least two physical interfaces 1a, and may transmit data to the first bidirectional bus 3 by using the at least two physical interfaces 1a.

In addition, the at least two physical interfaces 1a are both connected to the first bidirectional bus 3. To be specific, at least two physical channels are established between the first bidirectional bus 3 and the security subsystem 1, which actually also means that the at least two physical channels are established between the primary processing system 2 and the security subsystem 1. In this case, the primary processing system 2 can simultaneously transmit data to the security subsystem 1 by using the at least two physical channels, and the security subsystem 1 can simultaneously transmit data to the primary processing system 2 by using the at least two physical channels. When the primary processing system 2 transmits data to the security subsystem 1 by using the at least two physical channels, the security subsystem 1 may also transmit data to the primary processing system 2 by using the at least two physical channels. In other words, different operations may be performed simultaneously between the security subsystem 1 and the primary processing system 2 by using the first bidirectional bus 3 and different physical interfaces 1a. In this case, a parallel transmission manner is used between the security subsystem 1 and the primary processing system 2, thereby further increasing a rate of communication between the security subsystem 1 and the primary processing system 2.

Figure 1D:
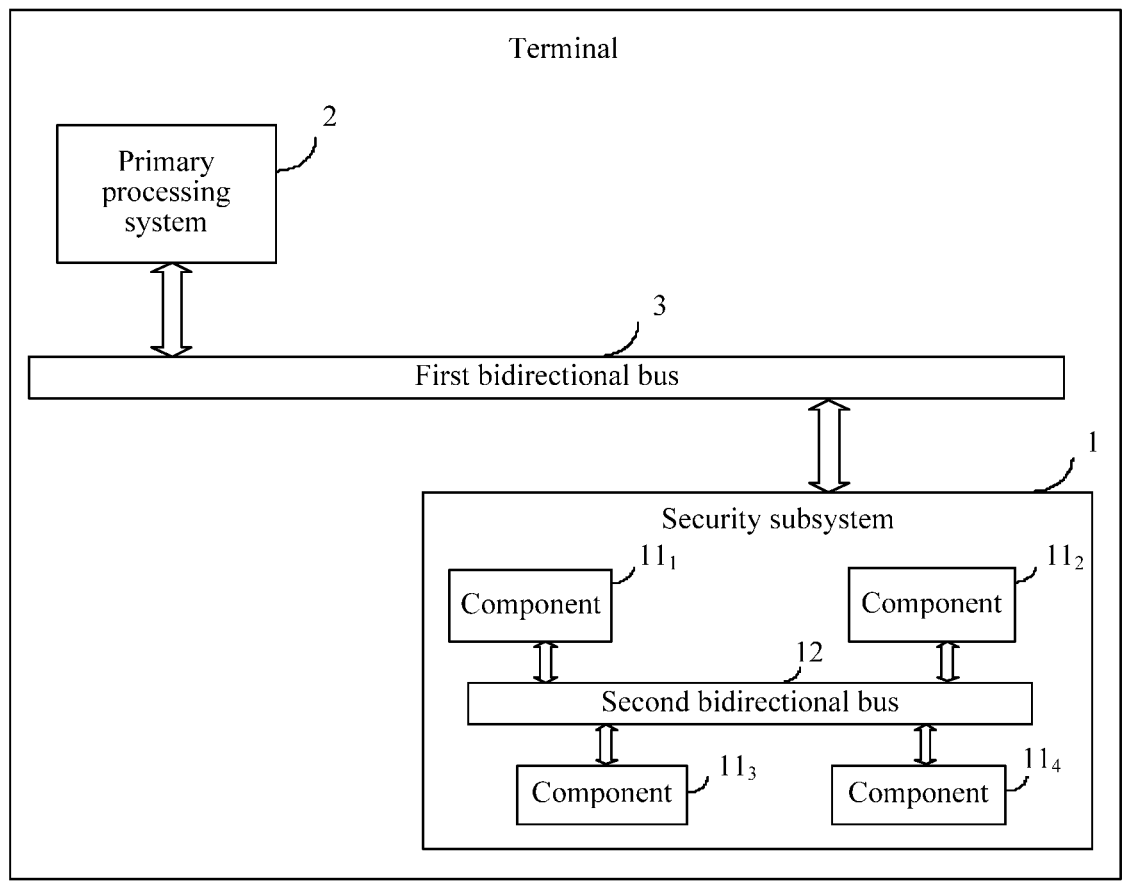
FIG. 1D is a schematic structural diagram of a fourth terminal according to an embodiment of this application.

Referring to FIG. 1D, the security subsystem 1 includes a plurality of components 11 and a second bidirectional bus 12.

Connections between the plurality of components 11 are established by using the second bidirectional bus 12, to implement data transmission between the plurality of components 11.

Figure 1E:
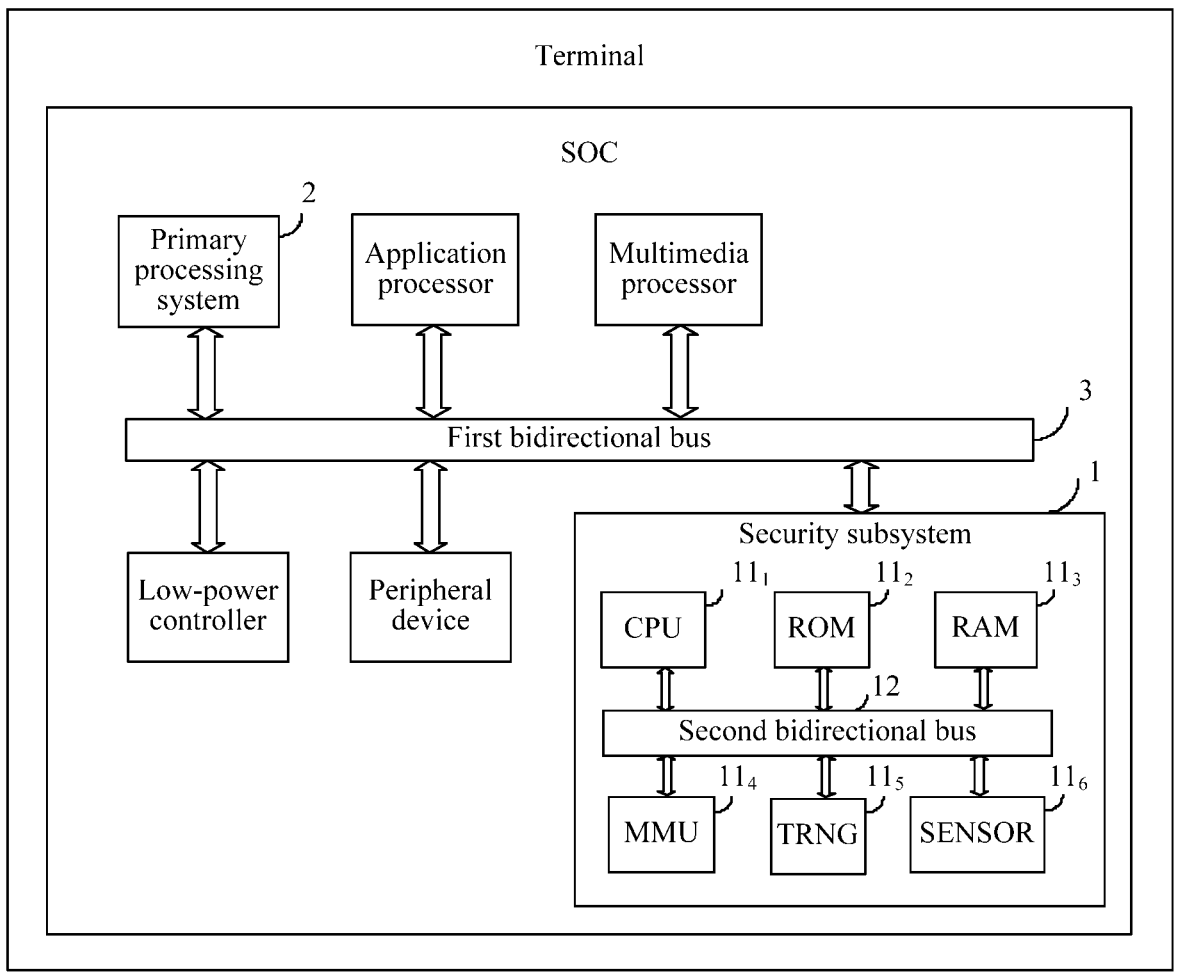
FIG. 1E is a schematic structural diagram of a fifth terminal according to an embodiment of this application.

It should be noted that the second bidirectional bus 12 has a bidirectional transmission capability, and the second bidirectional bus 12 may be a public path used between the plurality of components 11. Data can be transmitted between the plurality of components 11 by using the second bidirectional bus 12. For example, as shown in FIG. 1E, the plurality of components 11 may be a CPU $11_1$, a read-only memory (ROM) $11_2$, a random access memory (RAM) $11_3$, a memory management unit (MMU) $11_4$, a random number generator (TRNG) $11_5$, a sensor (SENSOR) $11_6$, and the like. Data may be transmitted between the plurality of components 11 by using the second bidirectional bus 12.

In addition, a transmission rate on the second bidirectional bus 12 is comparatively high and is generally greater than a transmission rate on a common bus. For example, the second bidirectional bus 12 may be an I2C bus, or an SPI bus. In an optional solution, the second bidirectional bus 12 may be a high-speed bus, and a transmission rate on the high-speed bus is greater than a transmission rate on a common bus. For example, the second bidirectional bus 12 may be a high-speed bus such as a PCIe bus or an HT bus.

It should be noted that after the connections between the plurality of components 11 are established by using the second bidirectional bus 12, any component $11_x$ in the plurality of components 11 can actively transmit data to another component $11_y$ by using the second bidirectional bus 12, and the another component $11_y$ can actively transmit data to the component $11_x$ by using the second bidirectional bus 12.

In addition, because a transmission rate on the second bidirectional bus 12 is comparatively high, when data is transmitted, by using the second bidirectional bus 12, between the plurality of components included in the security subsystem 1, a rate of data transmission between the plurality of components 11 is comparatively high, thereby improving data processing efficiency of the security subsystem 1.

Communication between the plurality of components 11 may be performed in a full-duplex manner by using the second bidirectional bus 12. To be specific, when any component $11_x$ in the plurality of components 11 transmits data to another component $11_y$ by using the second bidirectional bus 12, the another component $11_y$ may also transmit data to the component $11_x$ by using the second bidirectional bus 12. In this case, the plurality of components 11 can receive data while transmitting data, thereby further improving efficiency of data transmission between the plurality of components 11 and further improving data processing efficiency of the security subsystem 1.

Figure 1F:
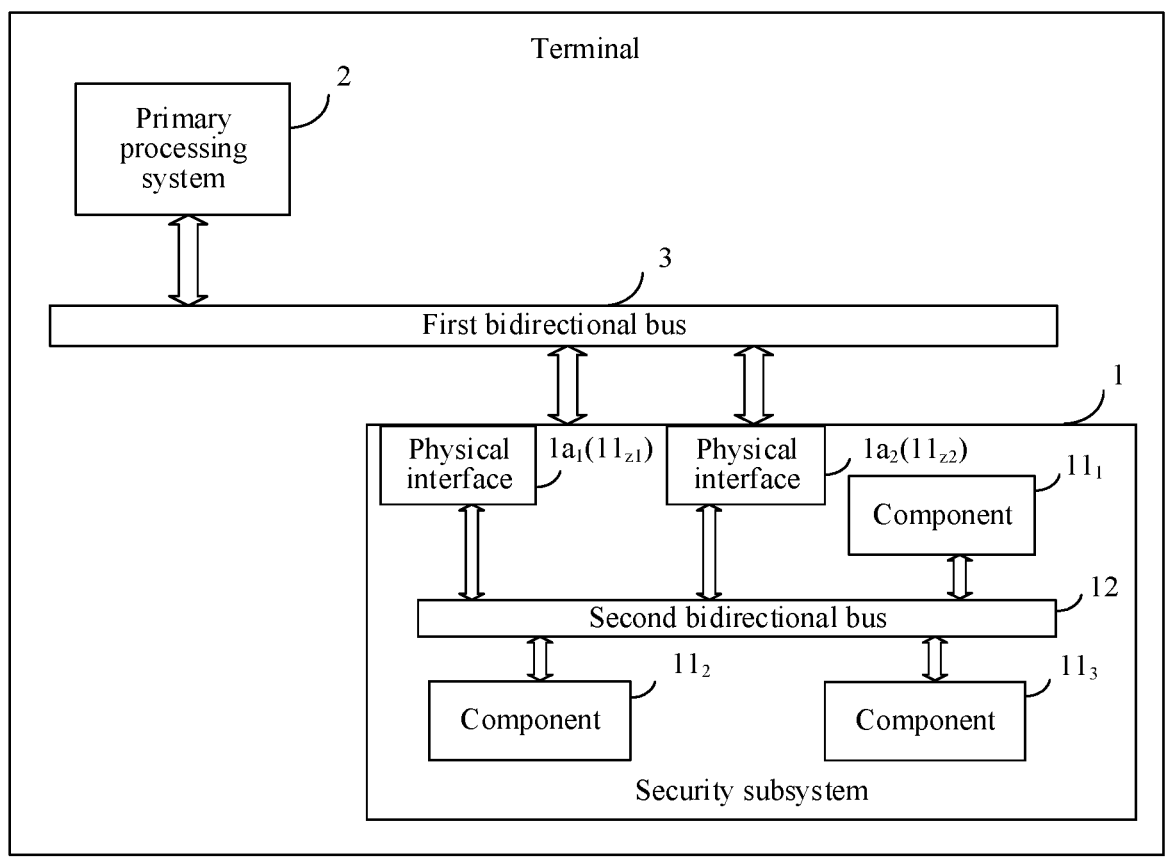
FIG. 1F is a schematic structural diagram of a sixth terminal according to an embodiment of this application.

Referring to FIG. 1F, at least two components $11_z$ in the plurality of components 11 are the at least two physical interfaces 1a.

In this case, each of the at least two physical interfaces 1a may be a bus interface. For example, the at least two physical interfaces 1a may be both mailboxes. In this case, a connection between the first bidirectional bus 3 and the second bidirectional bus 12 may be established by using the at least two physical interfaces 1a. The at least two physical interfaces 1a function as "converters" between the first bidirectional bus 3 and the second bidirectional bus 12. In other words, protocol conversion, data conversion, and the like between the first bidirectional bus 3 and the second bidirectional bus 12 can be completed by using the at least two physical interfaces 1a, thereby implementing communication between the first bidirectional bus 3 and the second bidirectional bus 12. In other words, data can be transmitted between the first bidirectional bus 3 and the second bidirectional bus 12 by using the at least two physical interfaces 1a.

In addition, any physical interface $1a_x$ in the at least two physical interfaces 1a may include components such as a bus bridge, an interrupt signal manager, a memory, and the like. In this case, the primary processing system 2 may write data into the memory in the physical interface $1a_x$ by using the bus bridge in the physical interface $1a_x$, and trigger an interrupt signal by using the interrupt signal manager in the physical interface $1a_x$, to instruct the security subsystem 1 to perform processing. Then, the security subsystem 1 may read the data from the memory and process the data. Similarly, the security subsystem 1 may write the data into the memory, and trigger the interrupt signal by using the interrupt signal manager, to instruct the primary processing system 2 to perform processing. Then, the primary processing system 2 may read the data from the memory by using the bus bridge and process the data.

In addition, a transmission rate is comparatively high in a transmission manner of transmitting data by using any physical interface $1a_x$ in the at least two physical interfaces 1a, and is generally greater than a transmission rate in a transmission manner of transmitting data by using a contact. For example, a transmission rate when data is transmitted by using a mailbox may be more than 3.6 Mb/s (megabits/second), and be dozens of times of the original transmission rate of data transmission performed by using a contact.

Figure 1G:
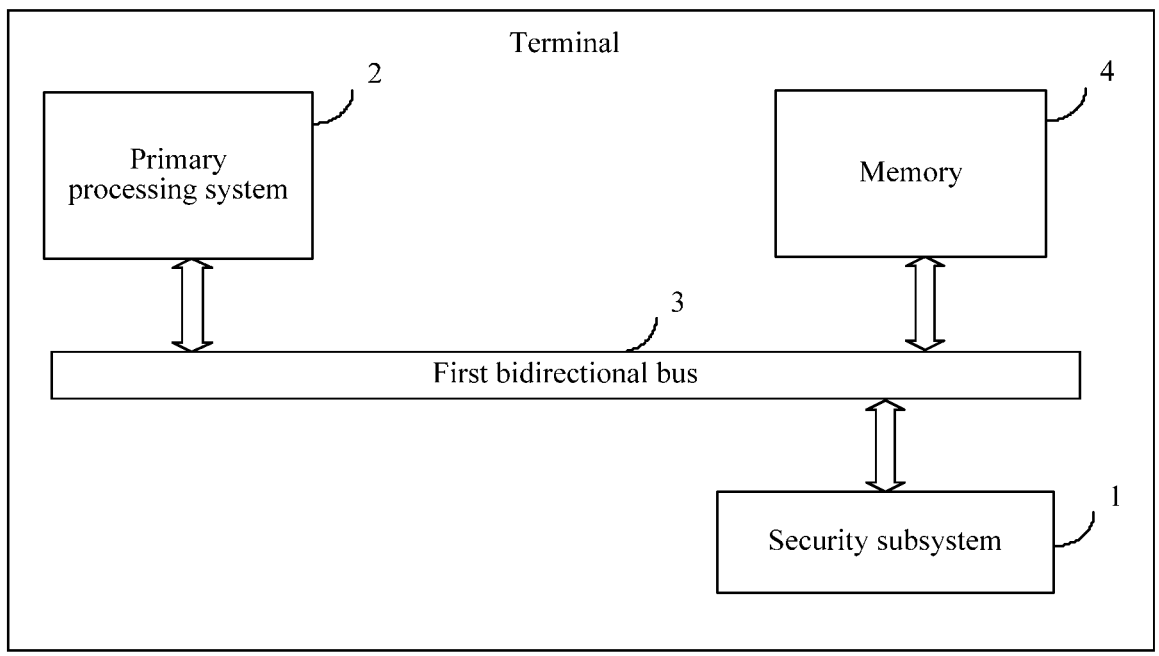
FIG. 1G is a schematic structural diagram of a seventh terminal according to an embodiment of this application.

Further, referring to FIG. 1G, the terminal may further include a memory 4.

A connection between the memory 4 and the security subsystem 1 is established by using the first bidirectional bus 3. The security subsystem 1 manages, by using the first bidirectional bus 3, data stored in the memory 4.

It should be noted that the memory 4 is a memory outside the security subsystem 1 and the primary processing system 2, and the memory 4 may be configured to store data managed by the security subsystem 1, or may be configured to store data managed by the primary processing system 2. This is not limited in this embodiment of this application.

Figure 1H:
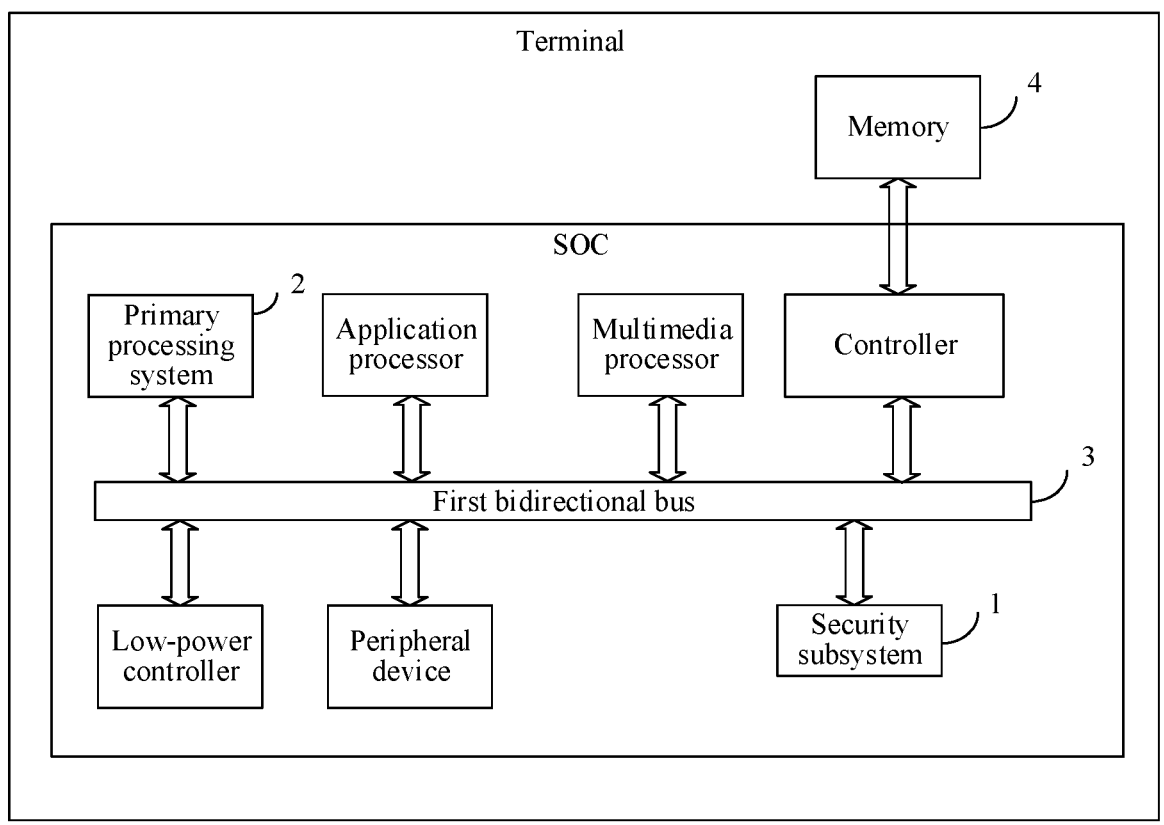
FIG. 1H is a schematic structural diagram of an eighth terminal according to an embodiment of this application.

In addition, when the security subsystem 1 and the primary processing system 2 are both included in the SOC of the terminal, the memory 4 may be a memory inside the SOC, or may be a memory outside the SOC. For example, the memory 4 may be a non-volatile memory (NVM) outside the SOC, or a dynamic random access memory (DRAM). When the memory 4 is a memory outside the SOC, as shown in FIG. 1H, the memory 4 may be connected to the first bidirectional bus 3 by using a controller included in the SOC.

It should be noted that when the memory 4 stores the data managed by the security subsystem 1, that is, when the security subsystem 1 can store the data managed by the security subsystem 1 in the memory 4, a volume of the data that can be managed by the security subsystem 1 is increased, thereby enlarging an application scope of the security subsystem. When a connection between the memory 4 and the security subsystem 1 is established by using the first bidirectional bus 3, because the transmission rate on the first bidirectional bus 3 is comparatively high, the security subsystem 1 can comparatively quickly obtain, from the memory 4 by using the first bidirectional bus 3, the data managed by the security subsystem 1.

In this embodiment of this application, the terminal includes the security subsystem, the primary processing system, and the first bidirectional bus coupled between the security subsystem and the primary processing system. The security subsystem is configured to manage at least one of the data related to a user identity and the data related to network security in the wireless communication, and exchange the data with the primary processing system by using the first bidirectional bus. The primary processing system is configured to exchange the data with the security subsystem by using the first bidirectional bus, and implement wireless communication by using the data. Because the connection between the security subsystem and the primary processing system is established by using the first bidirectional bus, the security subsystem and the primary processing system are in the same hierarchy. To be specific, the security subsystem can actively transmit data to the primary processing system by using the first bidirectional bus, and the primary processing system can also actively transmit data to the security subsystem by using the first bidirectional bus, thereby improving flexibility of communication between the security subsystem and the primary processing system. In addition, because the transmission rate on the first bidirectional bus is comparatively high, when data is transmitted between the security subsystem and the primary processing system by using the first bidirectional bus, a rate of data transmission between the security subsystem and the primary processing system is comparatively high, thereby increasing a rate of communication between the security subsystem and the primary processing system.

The following describes in detail a communication method applied to the terminal.

Figure 2A:
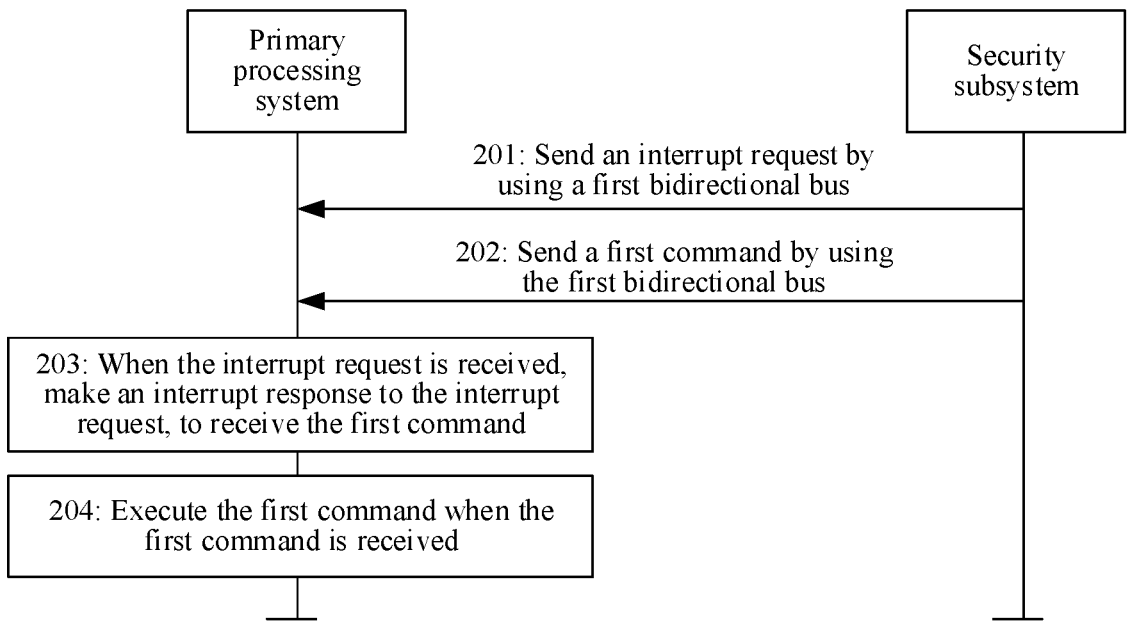
FIG. 2A is a flowchart of a communication method according to an embodiment of this application.

FIG. 2A is a flowchart of a communication method according to an embodiment of this application. The method may be applied to the terminal shown in any one of FIG. 1A to FIG. 1H. Referring to FIG. 2A, the communication method includes the following steps.

Step 201: A security subsystem sends an interrupt request to a primary processing system by using a first bidirectional bus.

In actual application, when the security subsystem needs to implement an operation that cannot be independently completed by the security subsystem, that is, when the security subsystem needs to implement an operation that can be completed only through participation of the primary processing system, the security subsystem may generate a first command for implementing the operation, and send the interrupt request to the primary processing system by using the first bidirectional bus, so that the primary processing system can normally receive the first command based on the interrupt request.

It should be noted that the first command is used to instruct the primary processing system to perform an operation related to data managed by the security subsystem, and the operation may be an operation that requires an information prompt, an operation that requires communication with a server, or the like. For example, the security subsystem may start a timer; and then, when the timer expires, prompt the timeout event (for example, indicate that a number package expires or that an identity number expires) by using the primary processing system. For another example, if the security subsystem needs to communicate with the server to complete functions such as data synchronization and data backup, a data channel may be established between the security subsystem and the server by using the primary processing system, to complete data communication with the server.

In addition, the interrupt request is used to instruct the primary processing system to receive the first command sent by the security subsystem. The interrupt request may not only wake up the primary processing system, but also make the primary processing system suspend a currently running program and instead to execute an interrupt service program (that is, a program of receiving the first command) indicated by the interrupt request. The interrupt request is a hardware signal mechanism. Therefore, reliability and timeliness can be ensured. For example, the interrupt request may be a level signal in a chip. The interrupt request may alternatively be another form of signal, for example, may be a pulse signal or a combination of a group of signals. This is not limited in this embodiment of this application.

Step 202: The security subsystem sends the first command to the primary processing system by using the first bidirectional bus.

It should be noted that, in this embodiment of this application, a contact connection manner used between the security subsystem and the primary processing system is changed to a bidirectional bus connection manner. In this way, the connection manner is changed, so that a manner of communication between the security subsystem and the primary processing system is changed. In other words, the security subsystem and the primary processing system are in the same hierarchy in a communication process in this way, and can actively transmit data to each other by using the first bidirectional bus. In this case, when the security subsystem needs to implement an operation that can be completed only through participation of the primary processing system, the security subsystem may actively send the interrupt request to the primary processing system by using the first bidirectional bus, and then actively send the first command to the primary processing system by using the first bidirectional bus.

Step 203: When the primary processing system receives the interrupt request, the primary processing system makes an interrupt response to the interrupt request, to receive the first command.

It should be noted that the interrupt response to the interrupt request may include suspending a currently running program and executing the program of receiving the first command. Therefore, after the primary processing system makes the interrupt response to the interrupt request, the first command can be normally received.

Step 204: When the primary processing system receives the first command, the primary processing system executes the first command.

It should be noted that a response result of the first command can be obtained after the primary processing system executes the first command, and the response result of the first command is used to indicate a completion status of an operation to be completed by the security subsystem.

Further, the primary processing system may further send the response result of the first command to the security subsystem by using the first bidirectional bus, so that the security subsystem can learn, in time based on the response result of the first command, the completion status of the operation to be implemented by the security subsystem.

In this embodiment of this application, the security subsystem and the primary processing system included in the terminal are connected by using the first bidirectional bus. In this case, the security subsystem and the primary processing system are in the same hierarchy. Therefore, when the security subsystem needs to perform, by using the primary processing system, the operation related to the data managed by the security subsystem, the security subsystem may actively send the interrupt request to the primary processing system by using the first bidirectional bus, and then actively send, to the primary processing system by using the first bidirectional bus, the first command for implementing the operation, to instruct the primary processing system to complete the operation. In this case, flexibility of communication between the security subsystem and the primary processing system is comparatively high. Because the security subsystem can actively send the first command to the primary processing system without an instruction from the primary processing system, a rate of communication between the security subsystem and the primary processing system is comparatively high.

The foregoing embodiment describes the process in which the security subsystem actively sends the first command to the primary processing system. The following describes a process in which the primary processing system actively sends a second command to the security subsystem.

Figure 2B:
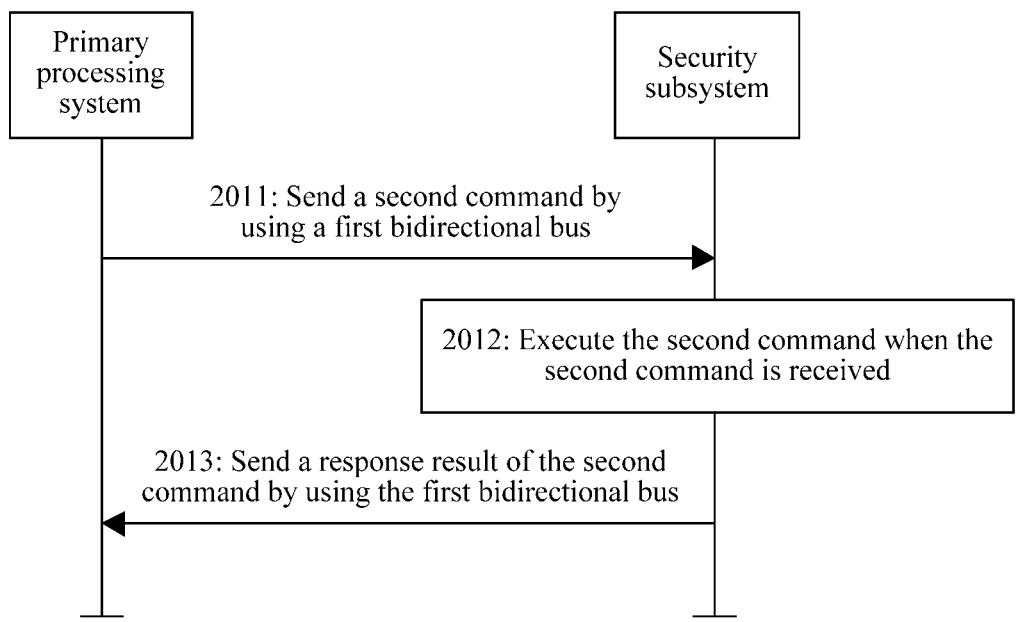
FIG. 2B is a flowchart of another communication method according to an embodiment of this application.

FIG. 2B is a flowchart of a communication method according to an embodiment of this application. Referring to FIG. 2B, the method includes the following steps.

Step 2011: The primary processing system sends a second command to the security subsystem by using the first bidirectional bus.

In actual application, when the primary processing system needs to implement an operation that cannot be independently completed by the primary processing system, that is, when the primary processing system needs to implement an operation that can be completed only through participation of the security subsystem, the primary subsystem may generate the second command for implementing the operation, and send the second command to the security subsystem by using the first bidirectional bus.

It should be noted that the second command is used to instruct the security subsystem to perform an operation related to the data managed by the security subsystem, and the operation may be reading the data managed by the security subsystem, updating the data managed by the security subsystem, requesting the security subsystem to perform calculation by using the data managed by the management and return a calculation result, or the like. For example, the primary processing system may perform authentication calculation to obtain an authentication result by using the security subsystem, to perform an authentication operation based on the authentication result. For another example, the primary processing system may read an IMSI from the security subsystem to access a network based on the IMSI.

Further, in order that the security subsystem can subsequently normally receive the second command, the primary processing system may further send the interrupt request to the security subsystem by using the first bidirectional bus when the primary processing system generates the second command, that is, before the primary processing system sends the second command to the security subsystem by using the first bidirectional bus.

It should be noted that the interrupt request is used to instruct the security subsystem to receive the second command sent by the primary processing system. The interrupt request may not only wake up the security subsystem, but also make the security subsystem to suspend a currently running program and instead to execute an interrupt service program (that is, a program of receiving the second command) indicated by the interrupt request. The interrupt request is a hardware signal mechanism. Therefore, reliability and timeliness can be ensured. For example, the interrupt request may be a level signal in a chip. The interrupt request may alternatively be another form of signal, for example, may be a pulse signal or a combination of a group of signals. This is not limited in this embodiment of this application.

Step 2012: When the security subsystem receives the second command, the security subsystem executes the second command.

The operation of receiving the second command by the security subsystem may be implemented based on the interrupt request sent by the primary processing system. When receiving the interrupt request, the security subsystem may make the interrupt response to the interrupt request to receive the second command.

It should be noted that the interrupt response to the interrupt request may include suspending the currently running program and executing the program of receiving the second command. Therefore, after the security subsystem makes the interrupt response to the interrupt request, the second command can be normally received.

Further, a response result of the second command can be obtained after the security subsystem executes the second command, and the response result of the second command is used to indicate a completion status of an operation to be completed by the primary processing system.

Step 2013: The security subsystem sends the response result of the second command to the primary processing system by using the first bidirectional bus.

Further, the primary processing system may receive the response result of the second command after the security subsystem sends the response result of the second command to the primary processing system by using the first bidirectional bus. In this case, the primary processing system can learn, in time based on the response result of the second command, the completion status of the operation to be implemented by the primary processing system.

It should be noted that, in this embodiment of this application, the commands (that is, the first command and the second command) used when interaction is performed between the security subsystem and the primary processing system may be commands in an application protocol data unit (APDU) format. In actual application, the commands may alternatively be commands in another format. This is not limited in this embodiment of this application.

In addition, the first command or the second command may carry a command data header. The command data header is used to indicate an operation to be executed by using the command, for example, an information prompt operation, an operation of communicating with the server, or a data read operation. When the first command or the second command can be executed only by using some data, the first command or the second command may further carry command data content. In this case, the command data header is used to instruct to perform an operation related to the command data content.

For example, the command data header carried in the first command may be used to instruct to perform the information prompt operation. The command data content carried in the first command includes information that needs to be prompted. In this case, the first command is used to prompt information included in the command data content carried in the first command. For example, the command data header carried in the second command may be used to perform the information prompt operation. The command data content carried in the second command is a storage location of data that needs to be read. In this case, the second command is used to read data at the storage location included in the command data content carried by the second command.

It should be noted that the response result of the first command or the response result of the second command may carry a processing status. The processing status is used to indicate a status of processing the command. The processing status may include a normal end, command unsupported, a command error parameter, and the like. When some data is obtained after the first command and the second command is processed, the response result of the first command or the response result of the second command may further carry data content obtained through processing.

For example, the processing status carried in the response result of the first command may be the normal end. For another example, the processing status carried in the response result of the second command may be the normal end, and the data content obtained through processing carried in the response result of the second command may be data obtained through reading, for example, an IMSI. In this case, then, the primary processing system may implement wireless communication based on the data obtained through reading.

It should be noted that when the first command or the second command carries both a command data header and command data content, the command data header and the command data content are transmitted between the security subsystem and the primary processing system at a time, thereby increasing a rate of communication between the security subsystem and the primary processing system. When the response result of the first command or the response result of the second command carries both a processing status and data content obtained through processing, the processing status and the data content obtained through processing are transmitted between the security subsystem and the primary processing system at a time, thereby increasing a rate of communication between the security subsystem and the primary processing system.

For example, in the original contact connection manner, when the primary processing system transmits a command to the security subsystem, the primary processing system needs to separately transmit the command data header and the command data content to the security subsystem. After the security subsystem executes the command, the processing status and the data content obtained through processing also need to be separately transmitted to the primary processing system. Therefore, interaction between the primary processing system and the security subsystem needs to be performed for a plurality of times. It is assumed that the primary processing system needs to transmit, to the security subsystem, a command for selecting a file, a file identifier (that is, the command data content) is two bytes, and file information (that is, the data content obtained through processing) is 50 bytes. In this case, 74 bytes in total need to be transmitted to complete the operation of selecting a file. In this embodiment of this application, the command data header and the command data content can be transmitted at a time, and the processing status and the data content obtained through processing can be transmitted at a time. Therefore, only 59 bytes are needed to complete the operation of selecting a file.

In this embodiment of this application, the security subsystem may actively send the first command to the primary processing system, and then the primary processing system returns the response result of the first command, to implement the operation to be completed by the security subsystem. In addition, the primary processing system may actively send the second command to the security subsystem, and then the security subsystem returns the response result of the second command, to implement the operation to be completed by the primary processing system. To be specific, when the security subsystem and the primary processing system interactively perform a specific operation, the operation can be completed through only two times of interaction. Therefore, the number of times of interaction between the security subsystem and the primary processing system is greatly reduced, and a rate of communication between the security subsystem and the primary processing system is increased.

The following describes a parallel transmission manner used between the security subsystem and the primary processing system.

The security subsystem may include at least two physical interfaces. The at least two physical interfaces are both connected to the first bidirectional bus. Therefore, at least two physical channels are established between the first bidirectional bus and the security subsystem, which actually also means that the at least two physical channels are established between the primary processing system and the security subsystem. Communication between the security subsystem and the primary processing system may be performed by using the at least two physical channels. In other words, different operations may be performed simultaneously between the security subsystem and the primary processing system by using the first bidirectional bus and different physical interfaces. In this case, a parallel transmission manner is used between the security subsystem and the primary processing system, thereby increasing a rate of communication between the security subsystem and the primary processing system.

For example, in step 202, when the security subsystem sends the first command to the primary processing system by using the first bidirectional bus, the security subsystem may first select one physical interface from the at least two physical interfaces as a target physical interface, and then send the first command to the primary processing system by using the target physical interface and the first bidirectional bus. Correspondingly, in step 204, when the primary processing system sends the response result of the first command to the security subsystem by using the first bidirectional bus, the primary processing system may send the response result of the first command to the security subsystem by using the first bidirectional bus and the target physical interface.

For another example, in step 2011, when the primary processing system sends the second command to the security subsystem by using the first bidirectional bus, the primary processing system may first select one physical interface from the at least two physical interfaces as a target physical interface, and then send the second command to the security subsystem by using the first bidirectional bus and the target physical interface. Correspondingly, in step 2013, when the security subsystem sends the response result of the second command to the primary processing system by using the first bidirectional bus, the security subsystem may send the response result of the second command to the primary processing system by using the target physical interface and the first bidirectional bus.

Further, when the parallel transmission manner is used between the security subsystem and the primary processing system, the primary processing system may simultaneously receive at least two commands by using the at least two physical interfaces. Similarly, the security subsystem may also simultaneously receive at least two commands by using the at least two physical interfaces. In this case, the primary processing system or the security subsystem may sequentially execute the at least two commands in descending order of priorities of the at least two simultaneously received commands.

When the parallel transmission manner is used between the security subsystem and the primary processing system, the security subsystem may receive another command by using a physical interface in a process of executing a command. Similarly, the primary processing system may also receive another command by using a physical interface in a process of executing a command. In this case, the security subsystem or the primary processing system may continue to execute the command when a priority of the command is higher than a priority of the another command, and execute the another command after the command is executed. When the priority of the command is lower than the priority of the another command, the security subsystem or the primary processing system may first interrupt execution of the command, and then execute the another command instead; and continue to execute the command after the another command is executed.

Figure 2C:
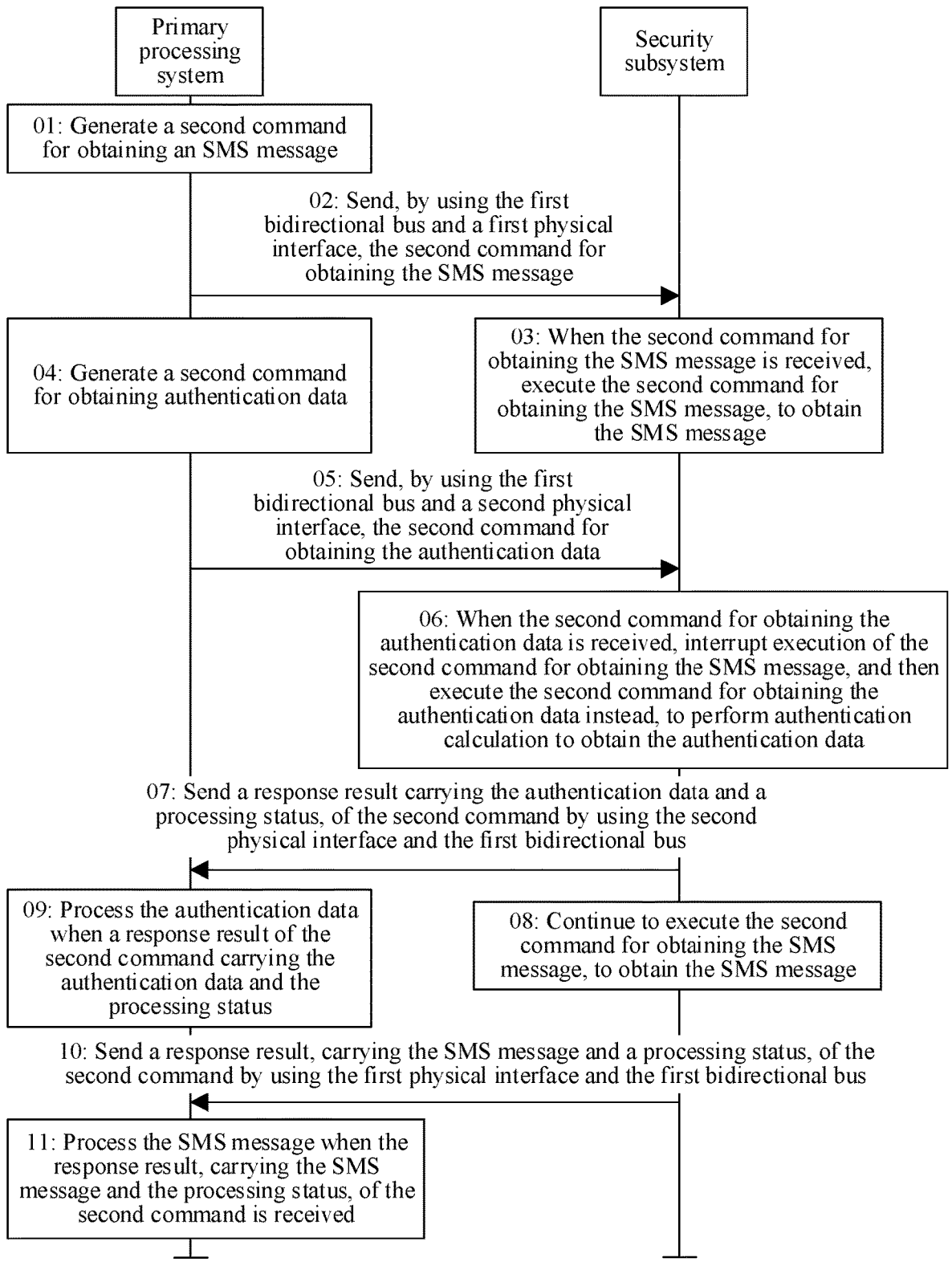
FIG. 2C is a schematic diagram of a parallel transmission manner according to an embodiment of this application.

With reference to FIG. 2C, the following describes the foregoing parallel transmission manner by using an example. Referring to FIG. 2C, the parallel transmission manner may include the following step 01 to step 11.

Step 01: The primary processing system generates a second command for obtaining an SMS message.

Step 02: The primary processing system sends, to the security subsystem by using the first bidirectional bus and a first physical interface, the second command for obtaining the SMS message.

Step 03: When receiving the second command for obtaining the SMS message, the security subsystem executes the second command for obtaining the SMS message, to obtain the SMS message.

Step 04: The primary processing system generates a second command for obtaining authentication data.

Step 05: The primary processing system sends, to the security subsystem by using the first bidirectional bus and a second physical interface, the second command for obtaining the authentication data.

Step 06: When the security subsystem receives the second command for obtaining the authentication data, if a priority of the second command for obtaining the authentication data is higher than the second command for obtaining the SMS message, the security subsystem interrupts execution of the second command for obtaining the SMS message, and then executes the second command for obtaining the authentication data instead, to perform authentication calculation to obtain the authentication data.

Step 07: The security subsystem sends a response result, carrying the authentication data and a processing status, of the second command to the primary processing system by using the second physical interface and the first bidirectional bus.

Step 08: The primary processing system processes the authentication data when receiving the response result, carrying the authentication data and the processing status, of the second command.

Step 09: The security subsystem continues to execute the second command for obtaining the SMS message, to obtain the SMS message.

Step 10: The security subsystem sends a response result, carrying the SMS message and a processing status, of the second command to the primary processing system by using the first physical interface and the first bidirectional bus.

Step 11: The primary processing system processes the SMS message when receiving the response result, carrying the SMS message and the processing status, of the second command.

It should be noted that a change in a connection manner used between the security subsystem and the primary processing system further causes a change in another aspect in a communication manner used between the security subsystem and the primary processing system.

For example, because the security subsystem and the primary processing system are connected by using the first bidirectional bus, a length of data transmitted between the security subsystem and the primary processing system for a single time by using the first bidirectional bus is not limited. In other words, a maximum length of the data transmitted for the single time is at least greater than 255 bytes, thereby greatly increasing a rate of communication between the security subsystem and the primary processing system. For example, in the original contact connection manner, a maximum length of data transmitted between the security subsystem and the primary processing system is 255 bytes. When to-be-transmitted data exceeds the maximum length, the to-be-transmitted data needs to be divided and then transmitted for a plurality of times. It is assumed that 500-byte data needs to be transmitted. In this case, the command needs to be sent twice. In other words, 517 bytes are needed in total. In this embodiment of this application, only one time of transmission is needed, and only 508 bytes are needed, because the length of data transmitted between the security subsystem and the primary processing system for a single time by using the first bidirectional bus is not limited.

For another example, when the security subsystem and the primary processing system are in the same hierarchy, the security subsystem can control a clock of the security subsystem. In other words, the security subsystem can control the clock of the security subsystem to stop, or may control the clock of the security subsystem to be restored, without an instruction from the primary processing system. Therefore, not only clock control efficiency of the security subsystem can be improved, but also communication resources of the primary processing system can be saved.

For another example, when the data managed by the security subsystem is stored in a memory outside the security subsystem, the security subsystem may comparatively quickly obtain the managed data from the memory by using the first bidirectional bus, so that a volume of data that can be managed by the security subsystem is increased without affecting a data obtaining speed of the security subsystem.

In this embodiment of this application, the security subsystem and the primary processing system are connected by using the first bidirectional bus. In this case, the security subsystem serves as an equal role of the primary processing system, and may have a larger application scope. In addition, due to the change of the communication manner caused by the change of the connection manner, not only a speed of reading the data managed by the security subsystem can be increased, but also a rate of communication between the primary processing system and the security subsystem can be increased. When the rate of communication between the primary processing system and the security subsystem is increased, performance (for example, a startup speed or a web search speed) of the terminal is also improved.

An embodiment of this application further provides a computer-readable storage medium. The computer-readable storage medium stores an instruction. When the instruction is run on a computer, the computer is enabled to perform one or more steps in any one of the foregoing methods. When the composition modules of the foregoing signal processing apparatus are implemented in a form of a software functional unit and sold or used as an independent product, the composition modules of the foregoing signal processing apparatus may be stored in the computer-readable storage medium. The computer-readable storage medium may be a power-off non-volatile memory, for example, an embedded multimedia card (eMMC), a universal flash storage (UFS), or a read-only memory (ROM); or a static storage device of another type that can store static information and an instruction; or a power-off volatile memory, for example, a random access memory (RAM), or a dynamic storage device of another type that can store information and an instruction; or an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other computer-readable storage medium that can be used to carry or store program code in a form of an instruction or a data structure and that can be accessed by a computer. This is not limited.

Based on such an understanding, an embodiment of this application further provides a computer program product including an instruction. Essentially, the technical solutions of this application or a part contributing to the prior art, or all or some of the technical solutions may be implemented in a form of a software product. The computer software product is stored in a storage medium, and includes several instructions for instructing a computer device (which may be a personal computer, a server, a network device, or the like) or a processor in a computer device to perform all or some of the steps of the methods described in the embodiments of this application. The several instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner.

All or some of the foregoing embodiments may be implemented by using software, hardware, firmware, or any combination thereof.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application. For example, for some specific operations in the apparatus embodiments, reference may be made to the foregoing method embodiments.

What is claimed is:

1. A terminal, wherein the terminal comprises a system on chip (SOC) and the SOC comprises a security subsystem, a baseband processor, and a first bidirectional bus coupled between the security subsystem and the baseband processor;
 the security subsystem is configured to manage data, the data including at least one of user data related to a user identity and security data related to network security in wireless communication, and exchange the data with the baseband processor by using the first bidirectional bus; and
 the baseband processor is configured to exchange the data with the security subsystem by using the first bidirectional bus, and implement wireless communication by using the data,
 wherein the security subsystem is capable of controlling a clock of the security subsystem, so that the security subsystem and the baseband processor are in the same hierarchy.

2. The terminal according to claim 1, wherein the data related to the user identity comprises at least one of an international mobile subscriber identity, an authentication key, a personal identification number, and an unlock code; and the data related to the network security comprises at least one of a location area identity, a temporary mobile subscriber identity, and a forbidden public land mobile network number.

3. The terminal according to claim 1, wherein the security subsystem comprises at least two physical interfaces; and
 the at least two physical interfaces are both connected to the first bidirectional bus, and the baseband processor simultaneously exchange data concurrently by using the at least two physical interfaces.

4. The terminal according to claim 1, wherein the security subsystem communicates with the baseband processor in a full duplex manner by using the first bidirectional bus.

5. The terminal according to claim 3, wherein the security subsystem comprises a plurality of components and a second bidirectional bus, and at least two of the plurality of components are the at least two physical interfaces; and
 a connection between the plurality of components is established by using the second bidirectional bus, to implement data transmission between the plurality of components.

6. The terminal according to claim 5, wherein the plurality of components communicate with each other in a full duplex manner by using the second bidirectional bus.

7. The terminal according to claim 1, wherein the terminal further comprises a memory; and
 a connection between the memory and the security subsystem is established by using the first bidirectional bus, and the security subsystem manages data stored in the memory by using the first bidirectional bus.

8. The terminal according to claim 1, wherein the security subsystem is an embedded subscriber identity module (eSIM).

9. The terminal according to claim 1, wherein the security subsystem, the baseband processor and the first bidirectional bus are integrated in a same chip.

10. A chip, comprising:
a security subsystem, a baseband processor, and a first bidirectional bus coupled between the security subsystem and the baseband processor, wherein
the security subsystem is configured to manage data, the data including at least one of user data related to a user identity and security data related to network security in wireless communication, and exchange the data with the baseband processor by using the first bidirectional bus; and
the baseband processor is configured to exchange the data with the security subsystem by using the first bidirectional bus, and implement wireless communication by using the data,
wherein the security subsystem is capable of controlling a clock of the security subsystem, so that the security subsystem and the baseband processor are in the same hierarchy.

11. The chip according to claim 10, wherein the data related to the user identity comprises at least one of an international mobile subscriber identity, an authentication key, a personal identification number, and an unlock code; and the data related to the network security comprises at least one of a location area identity, a temporary mobile subscriber identity, and a forbidden public land mobile network number.

12. The chip according to claim 10, wherein the security subsystem comprises at least two physical interfaces; and
the at least two physical interfaces are both connected to the first bidirectional bus, and the baseband processor simultaneously exchange data concurrently by using the at least two physical interfaces.

13. The chip according to claim 10, wherein the security subsystem communicates with the baseband processor in a full duplex manner by using the first bidirectional bus.

14. The chip according to claim 10, wherein the security subsystem is an embedded subscriber identity module (eSIM).

15. The chip according to claim 10, wherein the first bidirectional bus is a high-speed bus, and a transmission rate on the high-speed bus is greater than a transmission rate on a common bus.

16. The chip according to claim 15, wherein a maximum length of data in a single transmission between the security subsystem and the baseband processor by using the first bidirectional bus is greater than 255 bytes.

17. A communication method applied to a terminal, wherein the terminal comprises a security subsystem, a baseband processor, and a first bidirectional bus coupled between the security subsystem and the baseband processor; the security subsystem is configured to manage data, the data including at least one of user data related to a user identity and security data related to network security in wireless communication, and exchange the data with the baseband processor by using the first bidirectional bus; and the baseband processor is configured to exchange the data with the security subsystem by using the first bidirectional bus, and implement wireless communication by using the data, wherein the security subsystem is capable of controlling a clock of the security subsystem, so that the security subsystem and the baseband processor are in the same hierarchy; and the method comprises:
sending, by the security subsystem, an interrupt request to the baseband processor by using the first bidirectional bus, wherein the interrupt request is used to instruct the baseband processor to receive a first command sent by the security subsystem, and the first command is used to instruct the baseband processor to perform an operation related to data managed by the security subsystem; and
sending, by the security subsystem, the first command to the baseband processor by using the first bidirectional bus.

18. The method according to claim 17, wherein the method further comprises:
sending, by the baseband processor, a second command to the security subsystem by using the first bidirectional bus, wherein the second command comprises a command data header and command data content, and the command data header is used to instruct the security subsystem to perform an operation related to the command data content;
executing, by the security subsystem, the second command; and
sending, by the security subsystem, a response result of the second command to the baseband processor by using the first bidirectional bus, wherein the response result comprises a processing status and data content obtained through processing.

19. The method according to claim 18, wherein the security subsystem comprises at least two physical interfaces; and the sending, by the baseband processor, the second command to the security subsystem by using the first bidirectional bus comprises:
selecting, by the baseband processor, one physical interface from the at least two physical interfaces as a target physical interface; and
sending, by the baseband processor, the second command to the security subsystem by using the first bidirectional bus and the target physical interface; and
the sending, by the security subsystem, the response result of the second command to the baseband processor by using the first bidirectional bus comprises:
sending, by the security subsystem, the response result of the second command to the baseband processor by using the first bidirectional bus and the target physical interface.

20. The method according to claim 17, wherein a maximum length of data in a single transmission between the security subsystem and the baseband processor by using the first bidirectional bus is greater than 255 bytes.

* * * * *